(12) United States Patent
Kudose et al.

(10) Patent No.: US 8,581,468 B2
(45) Date of Patent: Nov. 12, 2013

(54) STATOR FOR ELECTRIC ROTATING MACHINE

(75) Inventors: Yuichi Kudose, Kariya (JP); Yusuke Hara, Anjo (JP); Takashi Hoshiyama, Obu (JP)

(73) Assignee: Denso Corporation, Kariya (JP)

(*) Notice: Subject to any disclaimer, the term of this patent is extended or adjusted under 35 U.S.C. 154(b) by 126 days.

(21) Appl. No.: 13/173,323

(22) Filed: Jun. 30, 2011

(65) Prior Publication Data

US 2012/0001515 A1   Jan. 5, 2012

(30) Foreign Application Priority Data

Jun. 30, 2010  (JP) ................................. 2010-149145

(51) Int. Cl.
*H02K 1/32*   (2006.01)
*H02K 17/16*  (2006.01)
*H02K 15/00*  (2006.01)
*H02K 1/20*   (2006.01)

(52) U.S. Cl.
USPC ...... 310/216.009; 310/216.008; 310/216.015; 310/216.018; 310/216.048; 310/216.049; 310/216.044; 310/156.78; 310/156.79; 310/156.81; 310/156.82; 310/156.83; 310/156.84; 310/411; 310/412

(58) Field of Classification Search
USPC .................... 310/216.004–216.008, 310/216.015–216.018, 216.011, 310/216.048–216.049, 216.059–216.065, 310/21.009, 216.044
See application file for complete search history.

(56) References Cited

U.S. PATENT DOCUMENTS

| 3,202,851 | A | * | 8/1965  | Dehlendorf et al. ... 310/216.048 |
| 4,080,724 | A | * | 3/1978  | Gillette ............................. 29/598 |
| 5,142,178 | A | * | 8/1992  | Kloster et al. .......... 310/216.048 |
| 5,300,843 | A | * | 4/1994  | Lyons et al. .................. 310/90.5 |
| 5,338,996 | A | * | 8/1994  | Yamamoto ............. 310/216.048 |
| 5,489,811 | A | * | 2/1996  | Kern et al. ............. 310/216.044 |
| 5,578,880 | A | * | 11/1996 | Lyons et al. .................. 310/90.5 |
| 6,531,797 | B2 | * | 3/2003 | Eydelie et al. ................... 310/71 |

(Continued)

FOREIGN PATENT DOCUMENTS

| JP | 2000201458 | * | 7/2000 |
| JP | 2002-51485 |   | 2/2002 |
| JP | 2007267493 | * | 10/2007 |

OTHER PUBLICATIONS

Machine translation of JP2007267493, Fujita et al, Oct. 11, 2007.*

(Continued)

*Primary Examiner* — John K Kim
*Assistant Examiner* — Tony M Joseph
(74) *Attorney, Agent, or Firm* — Nixon & Vanderhye P.C.

(57) ABSTRACT

A stator includes an annular stator core that is comprised of a plurality of stator core segments, an outer ring that is fitted on the radially outer surfaces of the stator core segments so as to fasten them together, and a stator coil mounted on the stator core. Each of the stator core segments is formed of a plurality of stator core sheets that are laminated in the axial direction of the stator core. Each of the stator core sheets has a reinforcement portion that includes a recess formed in one of the major surfaces of the stator core sheet and a protrusion formed on the other major surface. The stator core sheets are laminated so that for each adjoining pair of the stator core sheets, the protrusion of one of the stator core sheets is fitted in the recess of the other stator core sheet.

7 Claims, 10 Drawing Sheets

(56) References Cited

U.S. PATENT DOCUMENTS

| | | | |
|---|---|---|---|
| 6,891,299 B2* | 5/2005 | Coupart et al. | 310/156.55 |
| 6,975,057 B2* | 12/2005 | Gauthier et al. | 310/216.095 |
| 7,859,163 B2* | 12/2010 | Bertocchi et al. | 310/216.048 |
| 7,952,254 B2* | 5/2011 | Cho et al. | 310/216.118 |
| 2002/0105245 A1* | 8/2002 | Park | 310/218 |
| 2004/0056556 A1* | 3/2004 | Fujita | 310/217 |
| 2009/0085415 A1* | 4/2009 | Ionel et al. | 310/43 |
| 2009/0261686 A1* | 10/2009 | Kouda | 310/207 |
| 2009/0324435 A1* | 12/2009 | Sears et al. | 417/423.7 |
| 2010/0001611 A1* | 1/2010 | Utaka et al. | 310/216.009 |
| 2010/0244617 A1* | 9/2010 | Nobata et al. | 310/216.069 |

OTHER PUBLICATIONS

Machine translation of JP2000201458, Akita et al , Jul. 18, 2000.*

* cited by examiner

→ DIRECTION OF FASTENING FORCE
⇨ DIRECTION OF INDUCED STRESS

STATOR FOR ELECTRIC ROTATING MACHINE

CROSS-REFERENCE TO RELATED APPLICATION

This application is based on and claims priority from Japanese Patent Application No. 2010-149145, filed on Jun. 30, 2010, the content of which is hereby incorporated by reference in its entirety into this application.

BACKGROUND

1. Technical Field

The present invention relates to stators for electric rotating machines that are used in, for example, motor vehicles as electric motors and electric generators.

2. Description of the Related Art

Conventionally, there are known stators for electric rotating machines which include an annular stator core, a stator coil, and an outer ring.

The stator core is comprised of a plurality of stator core segments that are arranged in the circumferential direction of the stator core to adjoin one another in the circumferential direction. Further, to reduce iron loss of the stator core, each of the stator core segments is formed by laminating a plurality of stator core sheets in the axial direction of the stator core. Moreover, the stator core has a plurality of slots that are formed in the radially inner surface of the stator core so as to be spaced from one another in the circumferential direction of the stator core. The stator coil is mounted on the stator core so as to be received in the slots of the stator core. The outer ring is fitted on the radially outer surfaces of the stator core segments so as to fasten them together.

Moreover, Japanese Patent Application Publication No. 2002-51485 discloses a method of shrink-fitting the outer ring on the radially outer surfaces of the stator core segments. More specifically, according to the method, the inner diameter of the outer ring is set to be less than the outer diameter of the stator core. In the shrink-fitting process, the outer ring is first heated, thereby causing the inner diameter of the outer ring to become greater than the outer diameter of the stator core. Then, the outer ring is fitted on the radially outer surfaces of the stator core segments which together make up the radially outer surface of the stator core. Thereafter, the outer ring is cooled at room temperature until the difference in temperature between the outer ring and the stator core segments becomes zero. As a result, the stator core segments are fixed together by means of stress induced by the difference between the inner diameter of the outer ring and the outer diameter of the stator core.

Furthermore, to minimize the iron loss of the stator core, it is necessary to minimize the thickness of the stator core sheets. However, with decrease in the thickness of the stator core sheets, the strength of the same may be accordingly decreased.

Specifically, referring to FIG. 14, the fastening force of the outer ring 37A is applied radially inward to the stator core sheets 36A, inducing stress in the stator core sheets 36A in the circumferential direction of the stator core. Further, the circumferential stress induced in the stator core sheets 36A may cause the stator core sheets 36A to be deformed in the thickness-wise direction thereof (i.e., in the axial direction of the stator core), thereby making it difficult to maintain the fit between the outer ring 37A and the radially outer surfaces of the stator core segments 32A. More specifically, with the deformation of the stator core sheets 36A in the thickness-wise direction, the outer diameter of the stator core segments 32A will be accordingly decreased. Further, with the decrease in the outer diameter of the stator core segments 32A, the fastening force of the outer ring 37A applied to the stator core segments 32A will be accordingly decreased. Consequently, in the worst cases, the outer ring 37A will be detached from the stator core segments 32A, thereby causing them to be separated from each other.

SUMMARY

According to an embodiment, there is provided a stator for an electric rotating machine which includes an annular stator core, an outer ring and a stator coil. The stator core is comprised of a plurality of stator core segments that are arranged in the circumferential direction of the stator core to adjoin one another in the circumferential direction. The outer ring is fitted on the radially outer surfaces of the stator core segments so as to fasten the stator core segments together. The stator coil is mounted on the stator core. Each of the stator core segments is formed of a plurality of stator core sheets that are laminated in the axial direction of the stator core. Each of the stator core sheets has a pair of major surfaces perpendicular to the axial direction of the stator core and a reinforcement portion that includes a recess formed in one of the major surfaces of the stator core sheet and a protrusion formed on the other major surface. The stator core sheets are laminated so that for each adjoining pair of the stator core sheets, the protrusion of one of the stator core sheets is fitted in the recess of the other stator core sheet.

With the above configuration, since each of the stator core sheets has the reinforcement portion formed therein, it is possible to increase the second moment of area of a cross section of the stator core sheet which is perpendicular to the circumferential direction of the stator core. Consequently, the rigidity of the stator core sheets can be increased, thereby increasing the strength of the stator core sheets against the circumferential stress induced in the stator core sheets by the fastening force of the outer ring. As a result, it is possible to minimize the thickness of the stator core sheets while preventing the outer ring from being detached from the stator core segments due to deformation the stator core sheets. Moreover, since the protrusions of the stator core sheets are fitted in the corresponding recesses, it is possible to prevent the axial length of the stator core from being increased due to formation of the reinforcement portions in the stator core sheets.

It is preferable that a clearance is provided between each facing pair of side surfaces of the recesses and protrusions of the stator core sheets.

The stator core has a plurality of slots that are formed in the radially inner surface of the stator core so as to be spaced from one another in the circumferential direction of the stator core. Each of the reinforcement portions of the stator core sheets is preferably positioned radially outside the slots of the stator core. Moreover, each of the reinforcement portions may be formed to extend along the circumferential direction of the stator core. Otherwise, for each of the stator core sheets, the reinforcement portion of the stator core sheet may be formed to extend straight in a direction perpendicular to an imaginary plane that bisects the stator core sheet in the circumferential direction of the stator core.

For each of the stator core sheets, the reinforcement portion of the stator core sheet may be provided in a plurality of places in the stator core sheet.

Preferably, each of the stator core sheets includes an insulating layer that is provided on at least one of the major surfaces of the stator core sheet; for each adjoining pair of the stator core sheets, the protrusion of one of the stator core sheets is fitted in the recess of the other stator core sheet without a gap between a top surface of the protrusion and a bottom surface of the recess.

Each of the stator core sheets may further have a lock portion that includes a recess formed in one of the major surfaces of the stator core sheet and a protrusion formed on the other major surface. In this case, for each adjoining pair of the stator core sheets, the protrusion of the lock portion of one of the stator core sheets is fitted in the recess of the lock portion of the other stator core sheet, thereby locking the stator core sheets together.

It is preferable that each of the stator core sheets is made of magnetic steel.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 1:
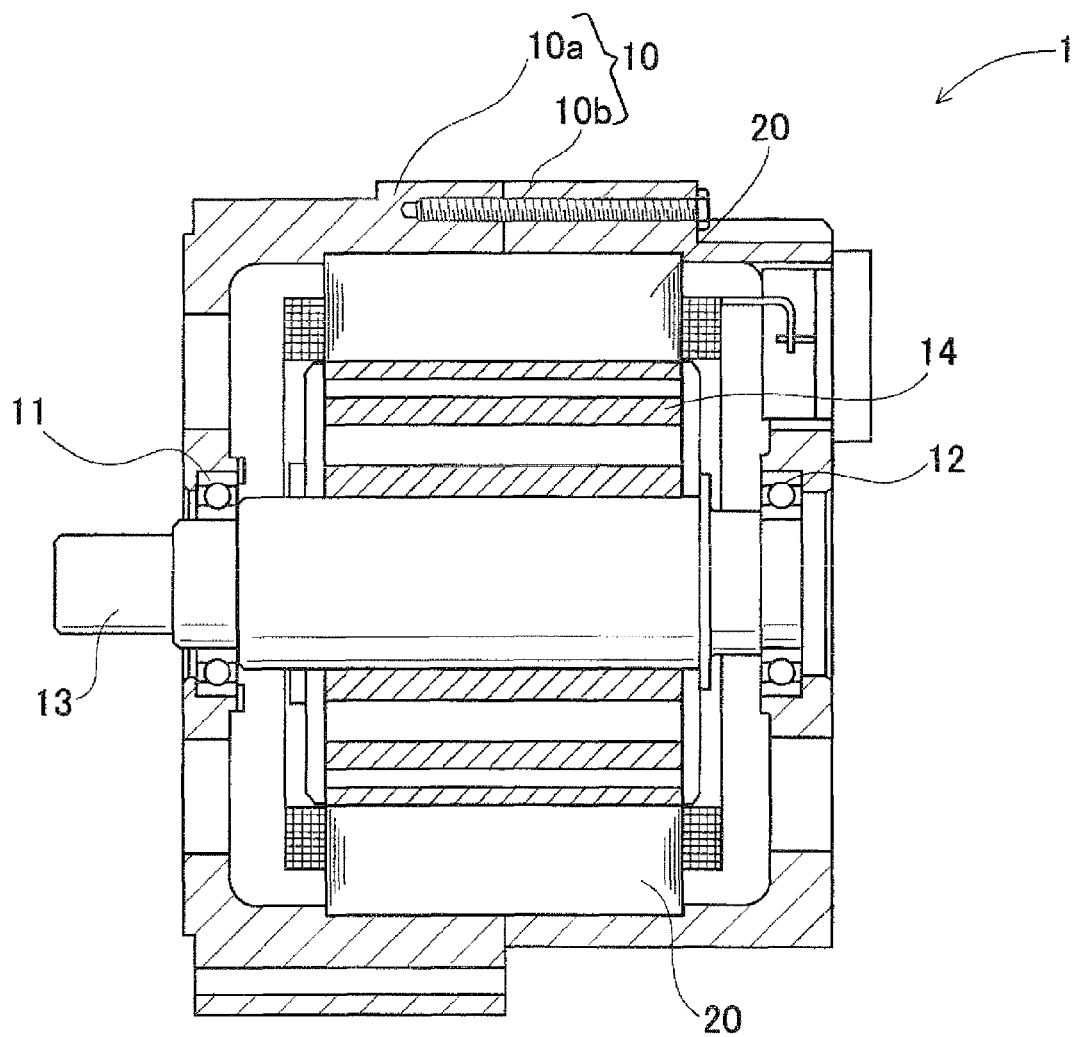
FIG. 1 is a schematic, partially cross-sectional view of an electric rotating machine which includes a stator according to an embodiment of the invention.

FIG. 1 shows the overall configuration of an electric rotating machine 1 which includes a stator 20 according to an embodiment of the invention.

The electric rotating machine 1 is designed to be used in a motor vehicle, such as an electric vehicle or a hybrid vehicle, and can function both as an electric motor and as an electric generator.

As shown in FIG. 1, the electric rotating machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 to face the radially inner periphery of the stator 20. The polarities of the magnetic poles alternate between north and south in the circumferential direction of the rotor 14. The number of the magnetic poles is set according to the design specification of the electric rotating machine 1. In the present embodiment, the number of the magnetic poles is set to be equal to, for example, eight (i.e., four north poles and four south poles).

Figure 2:
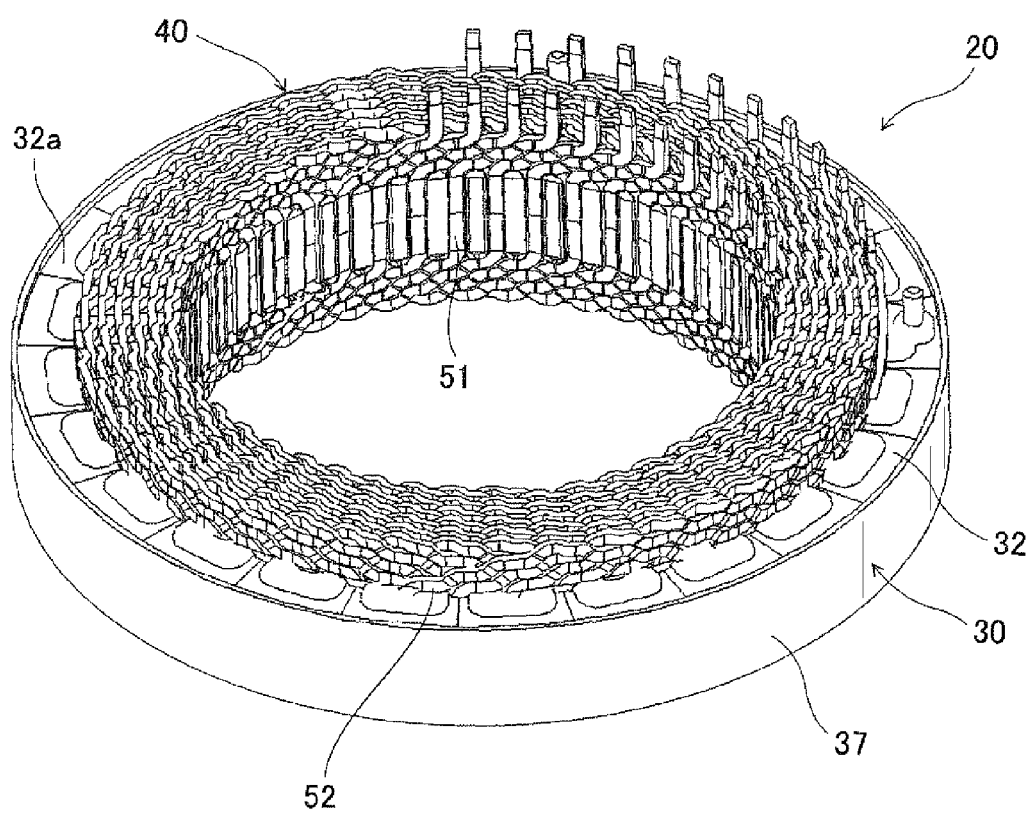
FIG. 2 is a perspective view of the stator.
Figure 3:
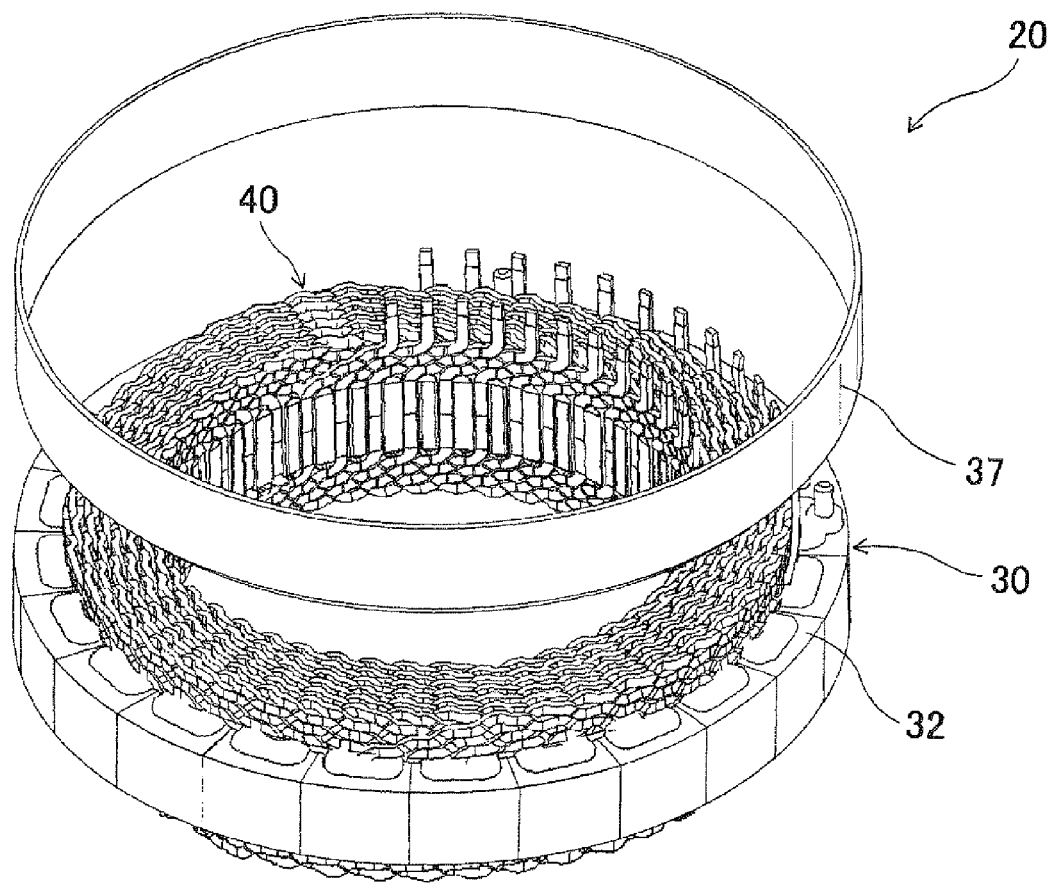
FIG. 3 is an exploded perspective view of the stator, wherein an outer ring is detached from a stator core.

Referring now to FIGS. 2 and 3, the stator 20 includes an annular stator core 30 and a three-phase stator coil 40 mounted on the stator core 30. In addition, the stator 20 may further have insulating paper interposed between the stator core 30 and the stator coil 40.

Figure 4:
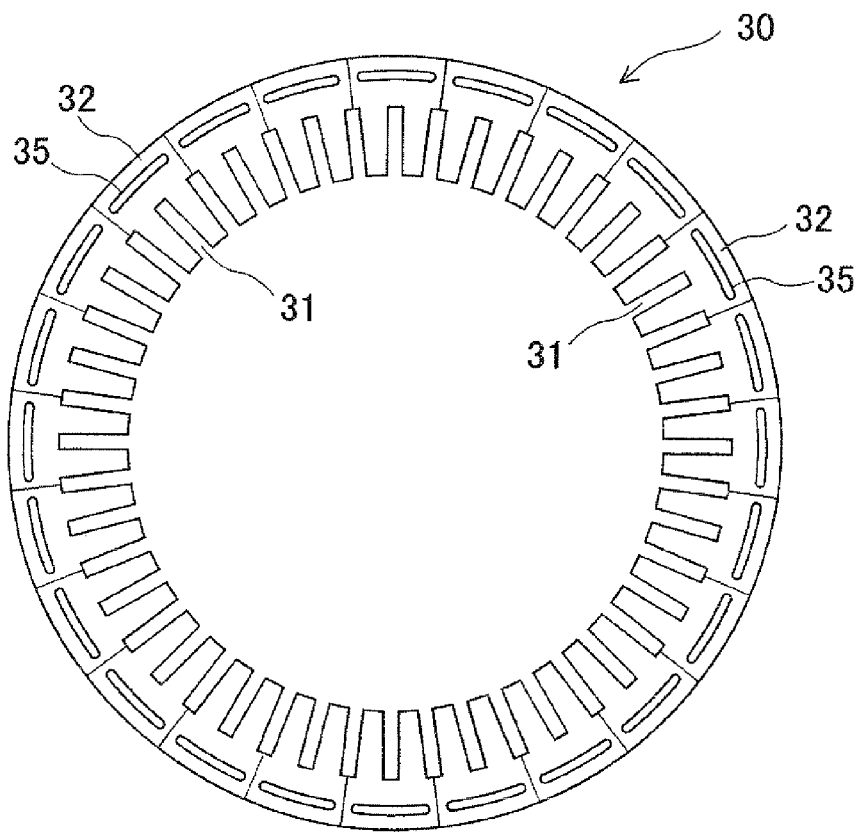
FIG. 4 is an axial end view of the stator core of the stator.

The stator core 30 has, as shown in FIG. 4, a plurality of slots 31 that are formed in the radially inner surface of the stator core 30 and spaced in the circumferential direction of the stator core 30 at predetermined intervals. For each of the slots 31, the depth-wise direction of the slot 31 is coincident with a radial direction of the stator core 30. In the present embodiment, there are provided two slots 31 per magnetic pole of the rotor 14 that has the eight magnetic poles and per phase of the three-phase stator coil 40. Accordingly, the total number of the slots 31 provided in the stator core 30 is equal to 48 (i.e., 2×8×3).

Moreover, in the present embodiment, the stator core 30 is comprised of, for example, 24 stator core segments 32. The stator core segments 32 are arranged in the circumferential direction of the stator core 30 so as to adjoin one another in the circumferential direction.

Further, referring again to FIGS. 2 and 3, the stator 20 includes an outer ring 37 that is shrink-fitted on the radially outer surfaces of the stator core segments 32, thereby fastening the stator core segments 32 together. The radially outer surfaces of the stator core segments 32 together make up the radially outer surface of the stator core 32.

Figure 5:
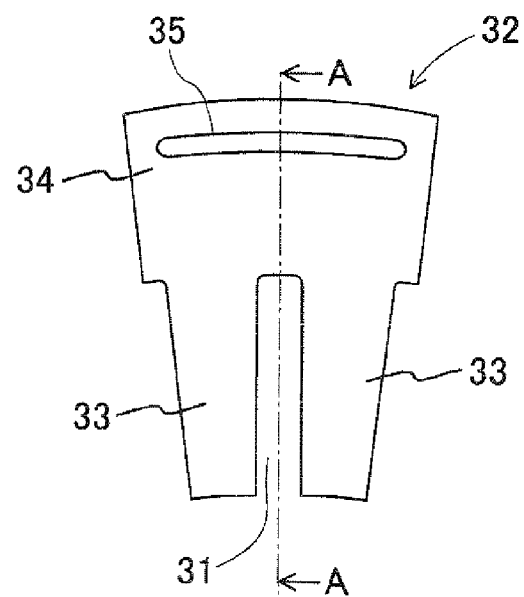
FIG. 5 is a plan view of one of stator core segments which together make up the stator core.

Referring further to FIG. 5, each of the stator core segments defines therein one of the slots 31. Moreover, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is positioned radially outside the tooth portions 33 to connect them.

Figure 6:
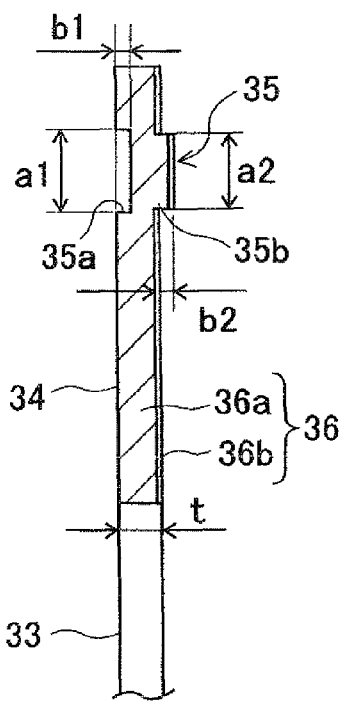
FIG. 6 is a cross-sectional view, taken along the line A-A in FIG. 5, of one of stator core sheets which are laminated to form the stator core segment of FIG. 5.
Figure 7:
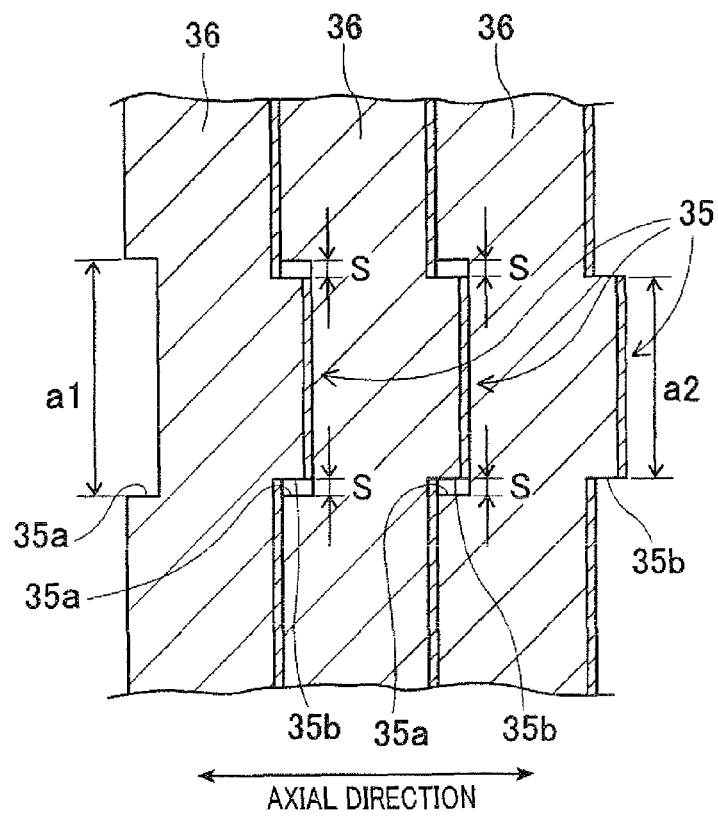
FIG. 7 is a cross-sectional view, taken along the line A-A in FIG. 5, of part of the stator core segment of FIG. 5.

In the present embodiment, as shown in FIGS. 6 and 7, each of the stator core segments 32 is formed by laminating a plurality of stator core sheets 36 in the axial direction of the stator core 30.

Further, each of the stator core sheets 36 is comprised of a metal sheet 36a and an insulating layer 36b formed on one of the major surfaces of the metal sheet 36a. The metal sheet 36a is made of, for example, magnetic steel. The insulating layer 36b is made of, for example, an electrically-insulative resin.

In addition, it should be noted that the term "major surfaces" used in describing the present invention denote those surfaces of a metal sheet 36a (or stator core sheet 36) which are perpendicular to the thickness-wise direction of the metal sheet 36a (or stator core sheet 36) and thus perpendicular to the axial direction of the stator core 30.

Furthermore, in the present embodiment, each of the stator core sheets 36 has a reinforcement portion 35 that is formed, for example by embossing press, in a radially outer part of the stator core sheet 36 which corresponds to the back core portion 34 of the stator core segment 32.

The reinforcement portion 35 includes a recess 35a formed in one of the major surfaces of the stator core sheet 36 and a protrusion 35b formed on the other major surface. In addition, since the reinforcement portion 35 is obtained by shear deformation of the radially outer part of the stator core sheet 36 during the embossing press, no insulating layer 36b exists on the side surfaces (i.e., shear surfaces) of the recess 35a and protrusion 35b of the reinforcement portion 35.

Moreover, as shown in FIG. 7, the stator core sheets 36 are laminated so that for each adjoining pair of the stator core sheets 36, the protrusion 35b of one of the stator core sheets 36 is fitted in the recess 35a of the other stator core sheet 36.

Referring again to FIG. 6, in the present embodiment, for the stator core sheets 36, the following dimensional relationships are specified:

$$a1=a2+s;$$

$$a1'=a2'+s; \text{and}$$

$$a1>t, a2>t, a1'>t, \text{and } a2'>t,$$

where a1 is the width of the recesses 35a of the stator core sheets 36 in the radial direction of the stator core 30, a2 is the width of the protrusions 35b of the stator core sheets 36 in the radial direction, a1' is the length of the recesses 35a in the circumferential direction of the stator core 30, a2' is the length of the protrusions 35b in the circumferential direction, t is the thickness of the stator core sheets 36, and s is a predetermined value in the range of 0.2t to 0.003 mm.

Specifying the above relationships, the protrusions 35b of the stator core sheets 36 can be reliably fitted into the corresponding recesses 35a. Moreover, as shown in FIG. 7, it becomes possible to provide a clearance S between each facing pair of the side surfaces of the recesses 35a and protrusions 35b. Consequently, with the clearance S, it is possible to suppress increase in eddy-current loss of the stator core 30.

Moreover, for the stator core sheets 36, the following dimensional relationship is further specified: b1=b2<0.8t, where b1 is the depth of the recesses 35a and b2 is the protruding height of the protrusions 35b in the axial direction of the stator core 30.

Specifying the above relationship, the protrusions 35b of the stator core sheets 36 can be fitted in the corresponding recesses 35a without a gap between the top surfaces of the protrusions 35b and the bottom surfaces of the corresponding recesses 35a. In other words, it is possible to place the top surfaces of the protrusions 35b in intimate contact with the bottom surfaces of the corresponding recesses 35a, as shown in FIG. 7.

Figure 8:
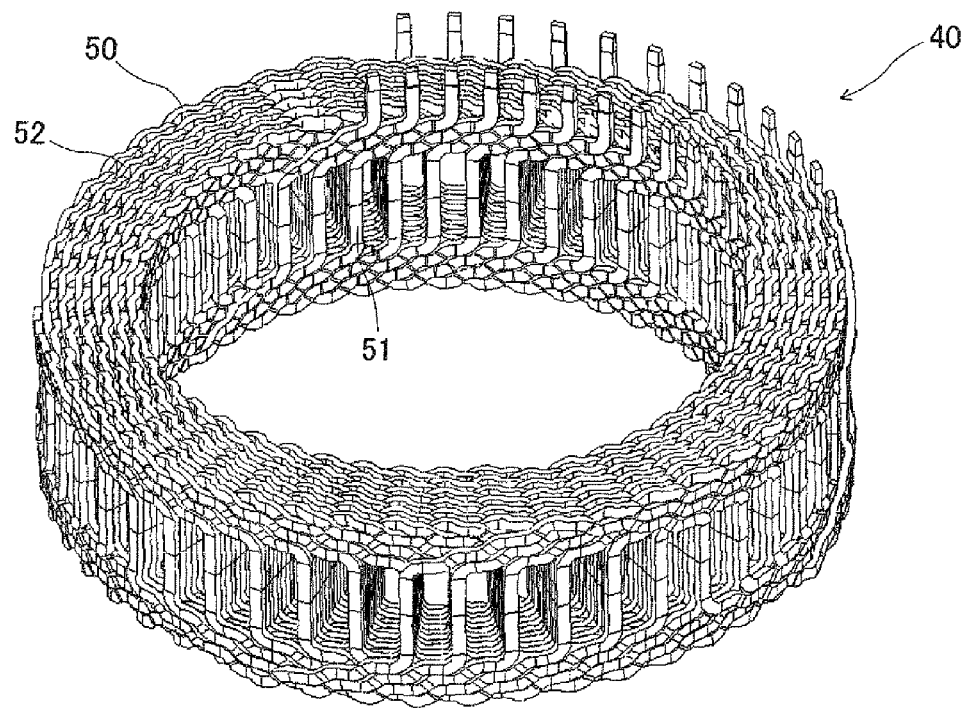
FIG. 8 is a perspective view of a stator coil of the stator.

Referring now to FIG. 8, the three-phase stator coil 40 is comprised of a plurality of (e.g., 12 in the present embodiment) wave-shaped electric wires 50. More specifically, the stator coil 40 is produced by first stacking the wave-shaped electric wires 50 to form a flat band-shaped electric wire assembly and then rolling the flat band-shaped electric wire assembly by a predetermined number of turns (e.g., 6 turns) into a hollow cylindrical shape.

Moreover, each of the wave-shaped electric wires 50 has a plurality of in-slot portions 51 and a plurality of turn portions 52. The in-slot portions 51 are equally spaced in the longitudinal direction of the electric wire 50 and extend perpendicular to the longitudinal direction. Further, after assembling the stator core 30 to the stator coil 40, each of the in-slot portions 51 is received in a corresponding one of the slots 31 of the stator core 30. On the other hand, each of the turn portions 52 extends to connect a corresponding adjacent pair of the in-slot portions 51. Further, after assembling the stator core 30 to the stator coil 40, each of the turn portions 52 is located outside the slots 31 of the stator core 30. In addition, each of the electric wires 50 is comprised of an electric conductor with a substantially rectangular cross section and an insulating coat that covers the outer surface of the electric conductor.

In assembling the stator core 30 to the stator coil 40, the tooth portions 33 of the stator core segments 32 are respectively inserted into the spaces formed between stacks of the in-slot portions 51 of the electric wires 50 from the radially outside of the stator coil 40. Then, the outer ring 37 is shrink-fitted on the radially outer surfaces of the stator core segments 32, thereby fastening the stator core segments 32 together to form the stator core 30. Consequently, referring back to FIG. 2, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding adjacent pair of the in-slot portions 51, protrudes from a corresponding one of the axial end faces 32a of the stator core 30.

In addition, in the present embodiment, each of the turn portions 52 of the electric wires 50 includes, at the center thereof, an apex part that is located axially furthest in the turn portion 52 from the corresponding axial end face 32a of the stator core 30 and extends parallel to the corresponding axial end face 32. Further, each of the turn portions 52 is stepped, on both sides of the apex part, to have a plurality of shoulder parts that extend parallel to the corresponding axial end face 30a of the stator core 30. Consequently, with the stepped shape of the turn portions 52, the protruding height of the turn portions 52 from the corresponding axial end faces 32a of the stator core 30 is reduced, thereby reducing the axial length of the entire stator core 20. Furthermore, each of the turn portions 52 of the electric wires 50 further has a crank-shaped part that is formed at the center of the apex part of the turn portion 52 so as to radially offset the turn portion 52. Consequently, with the crank-shaped parts, it becomes possible to arrange each adjacent pair of the turn portions 52 of the electric wires 50 in intimate contact with each other. As a result, the radial width of coil ends of the stator coil 40 is reduced; the coil ends are made up of the turn portions 52 of the electric wires 50. Moreover, it also becomes possible to make each adjacent pair of the turn portions 52 of the electric wires 50 extend in the circumferential direction of the stator core 30 without interference therebetween.

After having described the configuration of the stator 20 according to the present embodiment, advantages thereof will be described hereinafter.

In the present embodiment, the stator 20 includes the annular stator core 30, the outer ring 37 and the stator coil 40. The stator core 30 is comprised of the stator core segments 32 that are arranged in the circumferential direction of the stator core 30 to adjoin one another in the circumferential direction. The outer ring 37 is fitted on the radially outer surfaces of the stator core segments 32 so as to fasten the stator core segments 32 together. The stator coil 40 is mounted on the stator core 30. Further, in the present embodiment, each of the stator core segments 32 is formed of the stator core sheets 36 that are laminated in the axial direction of the stator core 30. Each of the stator core sheets 36 has the reinforcement portion 35 that includes the recess 35a formed in one of the major surfaces of the stator core sheet 36 and the protrusion 35b formed on the other major surface. The stator core sheets 36 are laminated so that for each adjoining pair of the stator core sheets 36, the protrusion 35b of one of the stator core sheets 36 is fitted in the recess 35a of the other stator core sheet 36.

With the above configuration, since each of the stator core sheets 36 has the reinforcement portion 35 formed therein, it is possible to increase the second moment of area of a cross section of the stator core sheet 36 which is perpendicular to the circumferential direction of the stator core 30 (e.g., the cross section shown in FIG. 6). Consequently, the rigidity of the stator core sheets 36 can be increased, thereby increasing the strength of the stator core sheets 36 against the circumferential stress induced in the stator core sheets 36 by the fastening force of the outer ring 37. As a result, it is possible to minimize the thickness of the stator core sheets 36 while preventing the outer ring 37 from being detached from the stator core segments 32 due to deformation the stator core sheets 36.

Moreover, since the protrusions 35b of the stator core sheets 36 are fitted in the corresponding recesses 35a, it is possible to prevent the axial length of the stator core 30 from being increased due to formation of the reinforcement portions 35 in the stator core sheets 36.

Furthermore, in the present embodiment, between each facing pair of the side surfaces of the recesses 35a and protrusions 35b of the stator core sheets 36, there is provided the clearance S as shown in FIG. 7.

Consequently, with the clearance S, it is possible to suppress increase in eddy-current loss of the stator core 30, thereby maintaining the benefits of reduction in iron loss of the stator core 30 obtained by minimization of the thickness of the stator core sheets 36.

In the present embodiment, the stator core 30 has the slots 31 that are formed in the radially inner surface of the stator core 30 so as to be spaced from one another in the circumferential direction of the stator core 30. Each of the reinforcement portions 35 of the stator core sheets 36 is positioned radially outside the slots 31 of the stator core 30 and extends along the circumferential direction of the stator core 30, as shown in FIG. 5.

With the above configuration, it is possible to allow the reinforcement portions 35 to extend along a magnetic path formed in the radially outer part of the stator core 30, thereby preventing the magnetic performance of the stator core 30 from being lowered due to formation of the reinforcement portions 35 in the stator core sheets 36.

In the present embodiment, as shown in FIG. 7, each of the stator core sheets 36 has the insulating layer 36b provided on the protrusion 35b-side major surface of the stator core sheet 36. Moreover, for each adjoining pair of the stator core sheets 36, the protrusion 35b of one of the stator core sheets 36 is fitted in the recess 35a of the other stator core sheet 36 without a gap between the top surface of the protrusion 35b and the bottom surface of the recess 35a.

With the above configuration, for each adjoining pair of the stator core sheets 36, there is interposed the insulating layer 36b between the top surface of the protrusion 35b and the bottom surface of the recess 35a. Consequently, with the insulating layer 36b, it is possible to more effectively suppress increase in eddy-current loss of the stator core 30.

In the present embodiment, each of the stator core sheets 36 is comprised of the metal sheet 36a and the insulating layer 36b formed on the protrusion 35b-side major surface of the metal sheet 36a. Moreover, the metal sheet 36a is made of magnetic steel.

Consequently, with the use of magnetic steel, it is possible to secure high magnetic performance of the stator core 30, thereby securing high efficiency of the electric rotating machine 1.

[First Modification]

In the previous embodiment, as shown in FIG. 5, each of the reinforcement portions 35 of the stator core sheets 36 is positioned radially outside the slots 31 of the stator core 30 and extends along the circumferential direction of the stator core 30. That is, each of the reinforcement portions 35 is curved to have the shape of an arc extending in the circumferential direction of the stator core 30.

Figure 9:
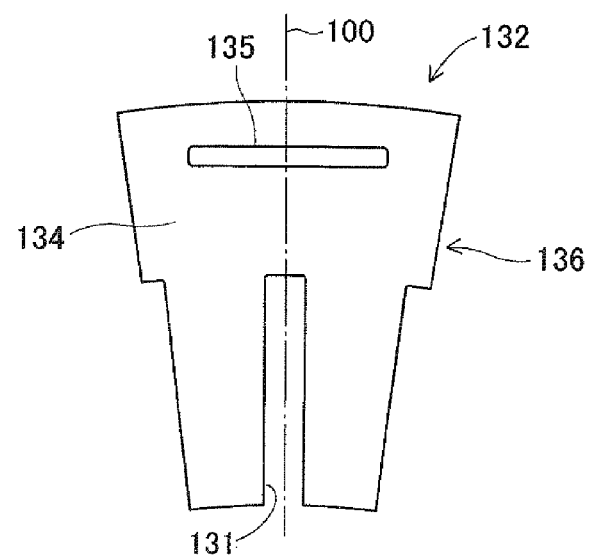
FIG. 9 is a plan view of a stator core segment according to a first modification to the embodiment.

In comparison, in this modification, as shown in FIG. 9, for each of the stator core sheets 136, the reinforcement portion 135 is formed to extend in a direction perpendicular to an imaginary plane 100 that bisects the stator core sheet 136 in the circumferential direction of the stator core. That is, unlike in the previous embodiment, the reinforcement portion 135 is formed to extend straight in this modification. Further, the reinforcement portion 135 is symmetrically positioned with respect to the imaginary plane 100. In addition, as in the previous embodiment, the reinforcement portion 135 is formed in a radially outer part of the stator core sheet 136 which corresponds to the back core portion 134 of the stator core segment 132. Consequently, in the resultant stator core, the reinforcement portion 135 is positioned radially outside the slots 131 of the stator core.

With the above configuration, it is possible to more easily form the reinforcement portions 135 in the respective stator core sheets 136, thereby improving the productivity of the stator core.

[Second Modification]

Figure 10:
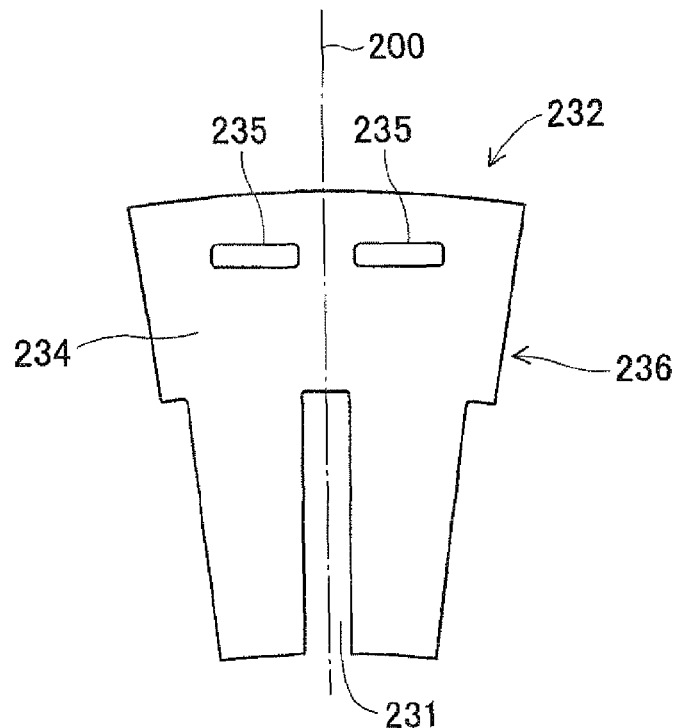
FIG. 10 is a plan view of a stator core segment according to a second modification to the embodiment.

Referring to FIG. 10, in this modification, each of the stator core sheets 236 has a pair of reinforcement portions 235. Each of the reinforcement portions 235 is formed to extend straight in a direction perpendicular to an imaginary plane 200 that bisects the stator core sheet 236 in the circumferential direction of the stator core. Further, the reinforcement portions 235 are symmetrically arranged with respect to the imaginary plane 200. Moreover, the reinforcement portions 235 are formed in a radially outer part of the stator core sheet 236 which corresponds to the back core portion 234 of the stator core segment 232. Consequently, in the resultant stator core, the reinforcement portions 235 are positioned radially outside the slots 231 of the stator core. In addition, the length of the reinforcement portions 235 is set to be one third of the length of the reinforcement portions 135 in the first modification.

With the above configuration, it is possible to increase the flexibility in optimally arranging the reinforcement portions 235 so as to prevent the magnetic performance of the stator core 30 from being lowered due to formation of the reinforcement portions 235.

In addition, it is possible to consider each of the stator core sheets 236 as having a composite reinforcement portion that is comprised of the pair of reinforcement portions 235. In other words, it is possible to consider each of the stator core sheets 236 as having a reinforcement portion that is provided in two different places in the stator core sheet 236.

[Third Modification]

Figure 11:
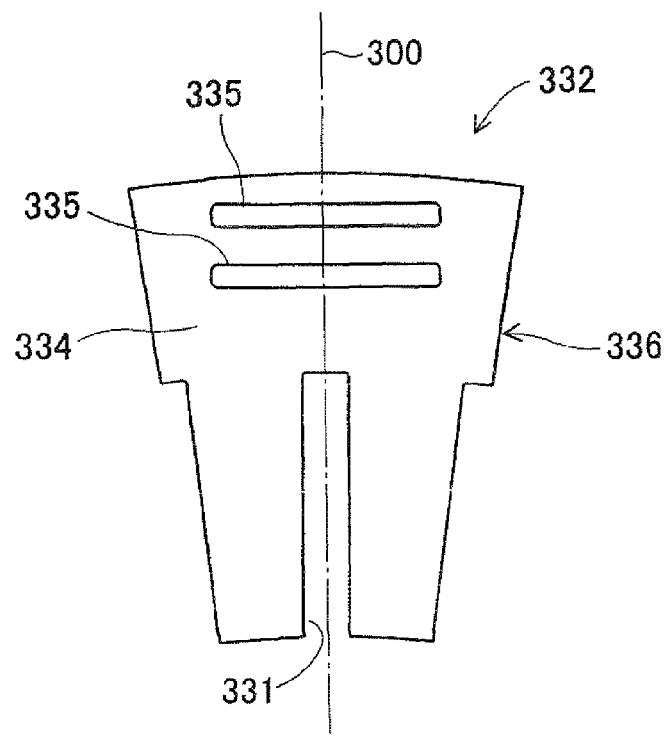
FIG. 11 is a plan view of a stator core segment according to a first modification to the embodiment.

Referring to FIG. 11, in this modification, each of the stator core sheets 336 has a pair of reinforcement portions 335. Each of the reinforcement portions 335 is formed to extend straight in a direction perpendicular to an imaginary plane 300 that bisects the stator core sheet 336 in the circumferential direction of the stator core. Further, each of the reinforcement portions 335 is symmetrically positioned with respect to the imaginary plane 300. Moreover, the reinforcement portions 335 are aligned with each other in the radial direction of the stator core. Furthermore, the reinforcement portions 335 are formed in a radially outer part of the stator core sheet 336 which corresponds to the back core portion 334 of the stator core segment 332. Consequently, in the resultant stator core, the reinforcement portions 335 are positioned radially outside the slots 331 of the stator core. In addition, the length of the reinforcement portions 335 is set to be equal to the length of the reinforcement portions 135 in the first modification.

With the above configuration, the rigidity of the stator core sheets 336 is further enhanced in comparison with that of the stator core sheets 136 according to the first modification.

In addition, it is possible to consider each of the stator core sheets 336 as having a composite reinforcement portion that is comprised of the pair of reinforcement portions 335. In other words, it is possible to consider each of the stator core sheets 336 as having a reinforcement portion that is provided in two different places in the stator core sheet 336.

[Fourth Modification]

Figure 12:
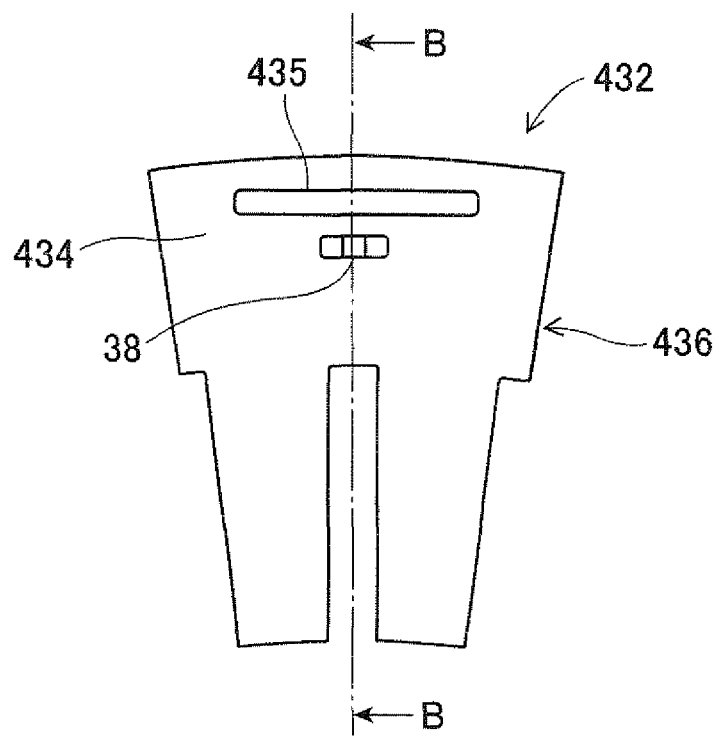
FIG. 12 is a plan view of a stator core segment according to a fourth modification to the embodiment.
Figure 13:
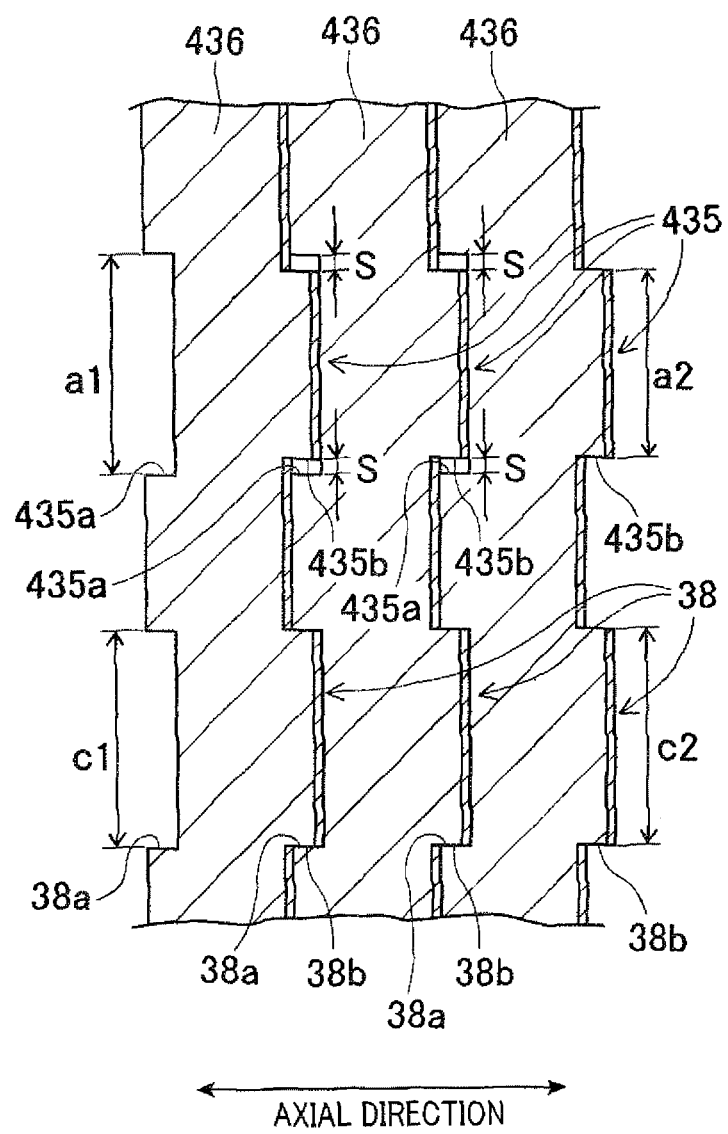
FIG. 13 is a cross-sectional view, taken along the line B-B in FIG. 12, of part of the stator core segment of FIG. 12.
Figure 14:
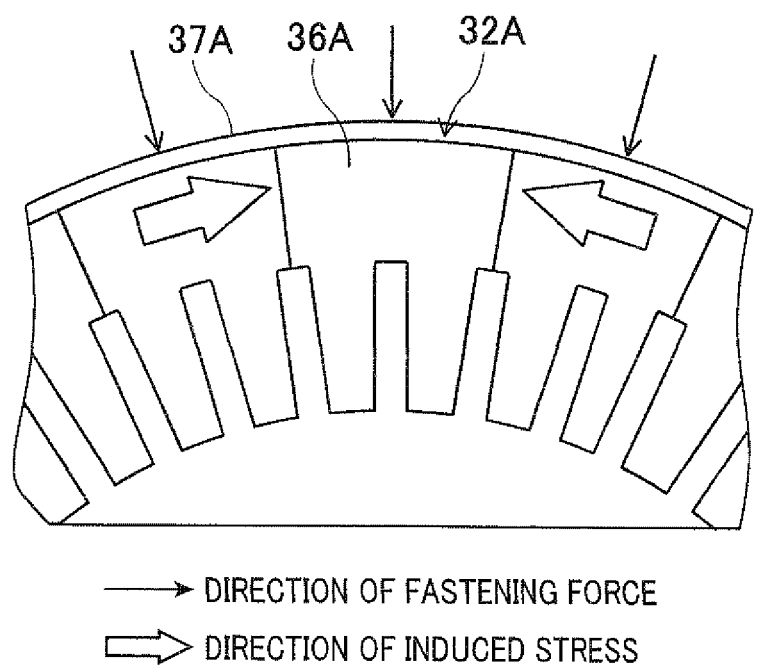
FIG. 14 is an axial end view of part of a stator according to the related art.

Referring to FIGS. 12 and 13, in this modification, each of the stator core sheets 436 has a reinforcement portion 435 that is identical to the reinforcement portions 135 of the stator core sheets 136 according to the first modification. Further, each of the stator core sheets 436 also has a lock portion 38 that is formed radially inside the reinforcement portion 435 by, for example, embossing press. The lock portion 38 includes a recess 38a formed in one of the major surfaces of the stator core sheet 436 and a protrusion 38b formed on the other major surface. The width C1 of the recess 38a in the radial direction of the stator core is set to be equal to or slightly less than the width C2 of the protrusion 38b in the radial direction. The length of the recess 38a in the circumferential direction of the stator core is set to be, for example, 3 times the length of the protrusion 38b in the circumferential direction. The depth of the recess 38a in the axial direction of the stator core is set to be equal to the protruding height of the protrusion 38b in the axial direction.

In laminating the stator core sheets 436 in the axial direction of the stator core, for each adjoining pair of the stator core sheets 436, the protrusion 435b of the reinforcement portion 435 of one of the stator core sheets 436 is fitted in the recess 435a of the reinforcement portion 435 of the other stator core sheet 436; further, between each facing pair of the side surfaces of the recess 435a and protrusion 435b, there is provided a clearance S. Moreover, for each adjoining pair of the stator core sheets 436, the protrusion 38b of the lock portion 38 of one of the stator core sheets 436 is fitted in the recess 38a of the lock portion 38 of the other stator core sheet 436; further, between each radially-facing pair of the side surfaces of the recess 38a and protrusion 38b, there is provided no clearance. That is, each radially-facing pair of the side surfaces of the recess 38a and protrusion 38b are in intimate contact with each other with or without pressure acting therebetween. Consequently, each adjoining pair of the stator core sheets 436 are locked together by means of frictional force acting between radially-facing pairs of the side surfaces of the recess 38a and protrusion 38b.

With the above configuration, it is possible to facilitate the process of laminating the stator core sheets 436 to form the stator core segments 432. Moreover, since each of the stator core sheets 436 has the lock portion 38 in addition to the reinforcement portion 435, the resistance of the stator core sheets 436 to deformation is increased. Consequently, it is possible to further enhance the strength of the stator core sheets 436 against the circumferential stress induced in the stator core sheets 436 by the fastening force of the outer ring 37.

While the above particular embodiment and modifications of the invention have been shown and described, it will be understood by those skilled in the art that various further modifications, changes, and improvements may be made without departing from the spirit of the invention.

For example, in the previous embodiment, for each of the stator core sheets 36, the insulating layer 35b is provided on the protrusion 35b-side major surface of the stator core sheet 36. However, it is also possible to provide the insulating layer 35b on the recess 35a-side major surface of the stator core sheet 36, instead of on the protrusion 35b-side major surface. Furthermore, it is also possible to provide the insulating layer 35b on both the major surfaces of the stator core sheet 36.

In the previous embodiment, the metal sheets 36a of the stator core sheets 36 are made of magnetic steel. However, the metal sheets 36a may also be made of other conventional metal.

In the second and third modifications, each of the stator core sheets is configured to include a pair of reinforcement portions. However, each of the stator core sheets may also be configured to include more than two reinforcement portions.

What is claimed is:

1. A stator for an electric rotating machine, the stator comprising:
    an annular stator core comprised of a plurality of stator core segments that are arranged in a circumferential direction of the stator core to adjoin one another in the circumferential direction;
    an outer ring that is fitted on radially outer surfaces of the stator core segments so as to fasten the stator core segments together; and
    a stator coil mounted on the stator core,
    wherein
    each of the stator core segments is formed of a plurality of stator core sheets that are laminated in an axial direction of the stator core,
    each of the stator core sheets has a pair of major surfaces perpendicular to the axial direction of the stator core and a reinforcement portion that includes a recess formed in one of the major surfaces of the stator core sheet and a protrusion formed on the other major surface,
    the stator core sheets are laminated so that for each adjoining pair of the stator core sheets, the protrusion of one of the stator core sheets is fitted in the recess of the other stator core sheet, and
    a clearance is provided between each facing pair of side surfaces of the recesses and protrusions of the stator core sheets.

2. The stator as set forth in claim 1, wherein the stator core has a plurality of slots that are formed in a radially inner surface of the stator core so as to be spaced from one another in the circumferential direction of the stator core, and
    each of the reinforcement portions of the stator core sheets is positioned radially outside the slots of the stator core and extends along the circumferential direction of the stator core.

3. The stator as set forth in claim 1, wherein the stator core has a plurality of slots that are formed in a radially inner surface of the stator core so as to be spaced from one another in the circumferential direction of the stator core,
    the reinforcement portions of the stator core sheets are positioned radially outside the slots of the stator core, and
    for each of the stator core sheets, the reinforcement portion of the stator core sheet is formed to extend straight in a direction perpendicular to an imaginary plane that bisects the stator core sheet in the circumferential direction of the stator core.

4. The stator as set forth in claim 1, wherein for each of the stator core sheets, the reinforcement portion of the stator core sheet is provided in a plurality of places in the stator core sheet.

5. The stator as set forth in claim 1, wherein each of the stator core sheets includes an insulating layer that is provided on at least one of the major surfaces of the stator core sheet, and for each adjoining pair of the stator core sheets, the protrusion of one of the stator core sheets is fitted in the recess of the other stator core sheet without a gap between a top surface of the protrusion and a bottom surface of the recess.

6. The stator as set forth in claim 1, wherein each of the stator core sheets further has a lock portion that includes a recess formed in one of the major surfaces of the stator core sheet and a protrusion formed on the other major surface, and for each adjoining pair of the stator core sheets, the protrusion of the lock portion of one of the stator core sheets is fitted in the recess of the lock portion of the other stator core sheet, thereby locking the stator core sheets together.

7. The stator as set forth in claim 1, wherein each of the stator core sheets is made of magnetic steel.

* * * * *